(12) United States Patent
Nagy

(10) Patent No.: US 8,937,571 B2
(45) Date of Patent: Jan. 20, 2015

(54) METHOD AND APPARATUS FOR DETECTING VEHICLE WHEELS

(75) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 428 days.

(21) Appl. No.: 13/489,088

(22) Filed: Jun. 5, 2012

(65) Prior Publication Data

US 2012/0326913 A1 Dec. 27, 2012

(30) Foreign Application Priority Data

Jun. 21, 2011 (EP) .................................... 11450079

(51) Int. Cl.
| | |
|---|---|
| *G01S 13/00* | (2006.01) |
| *G01S 13/91* | (2006.01) |
| *G01S 13/58* | (2006.01) |
| *G01S 17/88* | (2006.01) |
| *G08G 1/01* | (2006.01) |
| *G01S 7/41* | (2006.01) |
| *G01S 13/50* | (2006.01) |

(52) U.S. Cl.
CPC . *G01S 13/91* (2013.01); *G01S 7/41* (2013.01); *G01S 13/50* (2013.01); *G01S 7/415* (2013.01); *G01S 13/58* (2013.01); *G01S 17/88* (2013.01); *G08G 1/0116* (2013.01)
USPC ........................................................ 342/27

(58) Field of Classification Search
CPC ........... G01S 7/41; G01S 13/50; G01S 13/91; G01S 13/58; G01S 17/88; G08G 1/04

USPC .......................................................... 342/27
See application file for complete search history.

(56) References Cited

U.S. PATENT DOCUMENTS

2014/0218227 A1* 8/2014 Stelzen et al. ................ 342/104

FOREIGN PATENT DOCUMENTS

| DE | 10 2008 037 233 A1 | 3/2010 |
|---|---|---|
| DE | 102008037233 | * 3/2010 |

OTHER PUBLICATIONS

Extended European Search Report for corresponding European Patent Application No. 11 450 079.6, dated Oct. 17, 2011, 5pp.

* cited by examiner

*Primary Examiner* — Frank J McGue

(74) *Attorney, Agent, or Firm* — Fiala & Weaver P.L.L.C.

(57) ABSTRACT

A method for detecting the wheels of a vehicle that is traveling on a roadway in a travel direction and whose wheels project downward from the vehicle body and are at least partially exposed laterally at the level of the vehicle body, with the steps: emitting a concentrated electromagnetic measurement beam with a known temporal progression of frequency from the side of the roadway onto an area a predetermined distance above the roadway and at a slant with respect to the travel direction, receiving the measurement beam reflected by a passing vehicle and recording the temporal progression, relative to the known progression, of its frequency, and detecting a rectangular pulse occurring in the recorded progression within the time period when the vehicle body passes, as a wheel.

12 Claims, 3 Drawing Sheets

METHOD AND APPARATUS FOR DETECTING VEHICLE WHEELS

CROSS-REFERENCE TO RELATED APPLICATION(S)

This application claims priority to European Patent Application No. 11 450 079.6, filed on Jun. 21, 2011, the contents of which are hereby expressly incorporated by reference.

FIELD OF THE INVENTION

The present invention relates to a method for detecting the wheels of a vehicle that is traveling on a roadway in a travel direction and whose wheels project downward from the vehicle body and are at least partially exposed laterally at the level of the vehicle body.

BACKGROUND

Detecting vehicle wheels is of interest for numerous applications. Thus it is possible to infer with certainty from the recognition of wheels that a given traffic area is being driven on in order, for example, to monitor borders or to initiate certain actions such as triggering an alarm, switching on lighting, opening a barrier, taking a picture for monitoring purposes, etc. Modern traffic fee systems also frequently base the calculation of fees on the number of axles of vehicles, so that the detection of wheels (wheel axles) can also be an important basis for road tolls or parking fee systems.

Detecting the wheels of a moving vehicle based on the horizontal component of their tangential velocity, which differs from the remainder of the vehicle and brings about a corresponding Doppler frequency shift of a radar measuring beam, is known, for example, from DE 10 2008 037 233 A1. For this purpose, a radar speed measuring unit is used, which irradiates the lower area of passing vehicles with a radar beam lobe and, from the returning frequency mixture, determines a single speed measurement signal that has signal maxima at the locations of the wheels. Automatic detection of such maxima in a signal curve requires a signal-analytical search for extreme values and is correspondingly elaborate. In addition, gaps between a traction vehicle and its trailer can falsely indicate signal maxima and intermediate "false" maxima, which lead to an erroneous wheel detection.

SUMMARY

The methods and apparatuses for wheel detection of the present invention are realized more simply than known solutions.

In some embodiments, the invention is a method for detecting a wheel of a vehicle. The method includes: emitting a concentrated electromagnetic measurement beam with a known temporal progression (progression over time) of frequency from the side of a roadway onto an area at a predetermined distance above the roadway and at a slant with respect to the travel direction; receiving the measurement beam reflected by a passing vehicle and recording the temporal progression of its frequency, relative to the known progression; and detecting a rectangular pulse occurring in the recorded progression within the time period when the vehicle passes, as a wheel.

The detection of the rectangular pulse in the recorded reception frequency progression may be achieved by detecting two successive alternating frequency steps, between which a substantially constant frequency prevails.

In some embodiments, the invention is an apparatus for detecting the wheels of a vehicle that is traveling on a roadway in a travel direction and whose wheels project downward from the vehicle body and are at least partially exposed laterally. The apparatus includes: a Doppler lidar or radar for transmitting a concentrated electromagnetic measurement beam with a known temporal progression of frequency onto a target and recording the temporal progression of frequency of the measurement beam reflected from the target. The measurement beam is oriented from the side of the roadway onto an area a predetermined distance above the roadway and slanted with respect to the direction of travel, and a downstream evaluation unit detects a rectangular pulse occurring in the recorded progression within the time period when the vehicle passes, as a wheel.

BRIEF DESCRIPTION OF THE DRAWINGS

Further characteristics and advantages of the method and the apparatus follow from the description below of a preferred exemplary embodiment with reference to the accompanying drawings, in which.

DETAILED DESCRIPTION

The invention utilizes the recognition that the horizontal component of the tangential velocity of a rotating wheel at a defined predetermined height, i.e., if the wheel is "cut" at this height, is constant during the entire passage of the wheel. Moreover, unless the wheel is struck at exactly the level of its axle, the horizontal component is different from the vehicle velocity. Thus, a simple rectangular pulse detection is sufficient to detect a rotating wheel with certainty. Accordingly, a concentrated measurement beam is used in order to generate a point of incidence or measurement point on the vehicle body or the rotating wheel that is as small as possible. If the smallest possible point of incidence or measurement point is used, then it is possible to neglect other influences on the measurement such as those that appear when measuring the lateral projection component of the vehicle movement vector. An excessively large point of incidence or measurement point would lead to a widening of the frequency range in the reception signal because of the different projection angles. This concentration can be achieved, for example, by using a laser beam as the measurement beam or by extremely high-frequency radar beams, preferably in the range above 70 GHz, such as those used as long-range radar sensors in the vehicle field for collision prevention systems or lane-crossing alarm systems. Such high-frequency radar beams can be strongly concentrated with appropriate directional antennas, antenna arrays or radar lenses, so that their area of incidence on the body or the wheel has a diameter of several centimeters.

Figure 1:
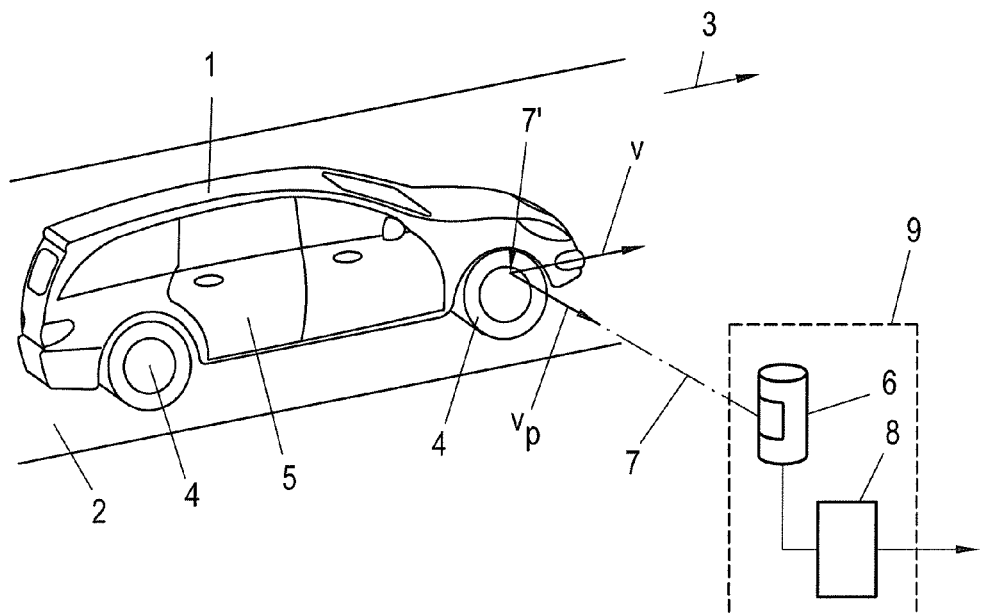
FIG. 1 shows an exemplary apparatus of the invention and an exemplary environment, in which the apparatus operates.

As shown in FIG. 1, a vehicle 1 is moving on a roadway 2 in a travel direction 3. The vehicle 1 has wheels 4 that project downward from the body 5 of the vehicle 2 and at the same time, at least partially, the wheels are exposed on the sides of the body in openings thereof, i.e., are visible from the side.

A Doppler lidar or radar device 6 emits a concentrated lidar or radar measurement beam 7 from the side of the roadway 1 at a slant to the travel direction 3 and slightly above the surface of the roadway, so that the measurement beam 7 strikes a passing vehicle 1 roughly in the area of its wheels 4.

In a manner known in the art, the Doppler lidar or radar device 6 evaluates, the reception frequency of the measurement beam 7 reflected by the vehicle 1 or its wheels 4. Accordingly, the (projected) component $v_p$ of the vehicle velocity v of the vehicle 1 in the direction of the measurement beam 7, or the tangential velocity $v_t$ (FIG. 2) of the wheels 4 at the point of incidence of the measurement beam 7', can be determined from the Doppler effect-induced frequency shift between emitted and reflected measurement beam 7. Subsequently, the wheels 4 of the vehicle 1 is detected from this information, as will be described in greater detail below. An evaluation unit 8, which undertakes the corresponding evaluations of the reception frequency of measurement beam 7, is arranged downstream of the device 6. The lidar/radar device 6 and the evaluation unit 8 thus together form a device 9 for detecting the wheels 4 of the vehicle 1.

The Doppler lidar/radar device 6 itself can be of any type known in the art, whether with a continuous, modulated or pulsed measurement beam 7. For a continuous measurement beam 7, a Doppler frequency shift between the natural frequencies ("carrier frequencies") of the emitted and reflected measurement beam 7 can be determined by interference measurement, for example. For a pulsed or modulated measurement beam, a Doppler shift between the pulse rates or modulation frequencies of the emitted and the reflected measurement beam 7 can be measured. The term "reception frequency" used here is understood to mean all such natural, carrier, pulsed or modulation frequencies of the measurement beam 7, i.e., the term "reception frequency" comprises any type of frequency of the measurement beam 7 influenced by a Doppler effect.

In principle, the nature of the measurement beam 7 itself is also arbitrary, so long as it is an electromagnetic wave, whether it be visible light or infrared light as in a lidar device or radio waves, especially microwaves, as in a radar device. The measurement beam 7 is strongly concentrated, so that its point of incidence 7' on the vehicle body 5 or the wheel 4 has a small diameter in the range of several centimeters, preferably <2 cm. Defined requirements are placed on the concentration of the measurement beam 7, depending on the distance of the device 6 from the roadway 2. In the ideal case, the measurement beam 7 is a bundle of nearly parallel light or radar rays that can be obtained with a laser. But even with a radar measurement beam, a corresponding concentration can be achieved by using radar waves with a very high frequency, for example, above 70 GHz, which have nearly the properties of light and can be concentrated by radar lenses. The use of directional antennas, e.g., antenna arrays and patch antennas with the most parallel, small-diameter radiation characteristic possible, also generates an appropriate radar measurement beam. In some embodiments, radar devices from the automotive field, such as those used in vehicles as collision and distance warning devices are used. Such concentrated measurement beams 7 have a concentration or a diversion/expansion range (aperture angle) of less than 1° (which corresponds to a solid angle of less than approximately 0.00024 sr).

The term "concentrated" measurement beam is understood in the present specification as a measurement beam having a beam expansion (angle of aperture) of a few degrees, preferably <1° (corresponds to <0.00024 sr), so that, over the distance between the lidar or radar device and the scanned vehicle, a point of incidence on the vehicle with a maximum diameter in the centimeter range is achieved, preferably <5 cm, especially preferably <2 cm.

Figure 2:
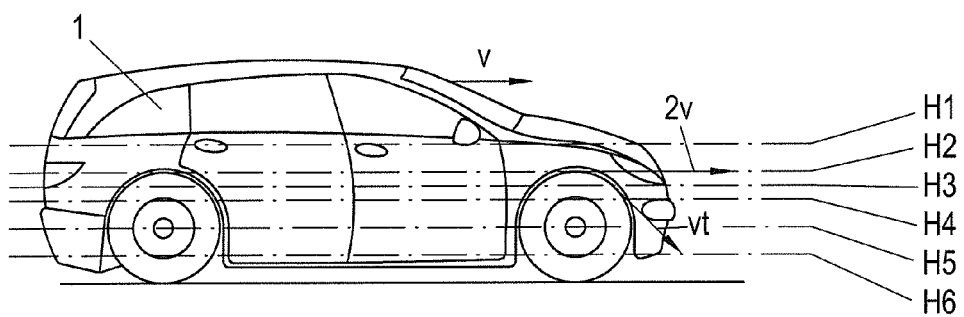
FIG. 2 shows several exemplary scanning progressions of a concentrated measurement beam on a passing vehicle, according to some embodiments of the present invention.

FIG. 2 shows the scanning progressions of such a concentrated measurement beam 7, which strikes the vehicle 1 or its wheels 4 substantially in point form during the passage of the vehicle 1 past the device 9. For explanatory purposes, six different scanning progressions H1 through H6 are shown for the sake of example. However, it is understood that only a single scanning progression H1-H6 from a concentrated measurement beam 7 occurs during passage of a vehicle.

Figure 3:
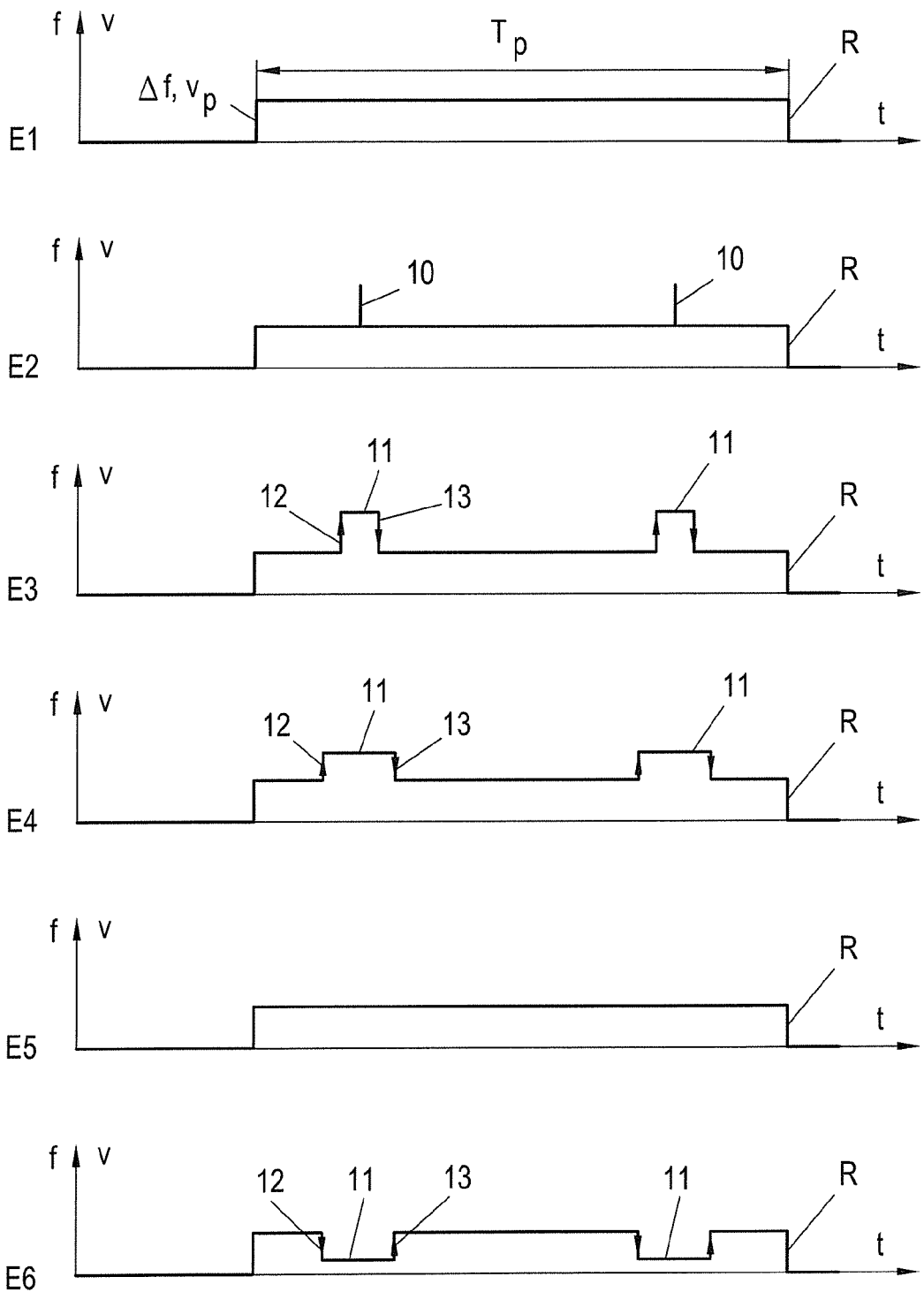
FIG. 3 shows timing diagrams of the determined progressions of reception frequency or speed for the scanning progressions of FIG. 2.

FIG. 3 shows the reception frequency f of the reflected measurement beam 7 over time for the scanning progressions H1-H6 continuously received by the lidar/radar device 6. The Doppler shift Δf of the reception frequency f relative to the transmission frequency is proportional to the velocity component $v_p$ of the respectively scanned parts of the vehicle 1, or the wheel 4. The reception frequency progressions E1-E6 illustrated in FIG. 3 are therefore reflective of the velocity progressions.

As can be seen from the reception frequency progression E1 of FIG. 3, the scanning progression H1, which strikes the body 5 of the vehicle 1 outside the wheels 4, has a substantially constant reception frequency shift Δf of the measurement beam 7. Thus the velocity component $v_p$ during the duration $T_p$ of the body passage is expressed as a rectangular pulse R in the reception frequency progression.

For the scanning progression H2, which strikes the wheels 4 at their uppermost point, where their tangential velocity $v_t$ is added to the vehicle velocity v, the reception frequency progression E2 has a peak 10 of $2v_p$ above the body rectangular pulse R for each wheel 4.

If the measurement beam 7 strikes the wheels 4 at a level between the wheel axle and the upper side of the wheel, as in the scanning progressions at H3 and H4, an abruptly varying Doppler shift in the measurement direction relative to the body pulse R, and thus a shift in the reception frequency or speed, is measured during the passage of a wheel 4, corresponding to the projection $v_p$ of its tangential velocity $v_t$, as illustrated by the rectangular pulses 11 of the progressions E3 and E4. Each pulse 11 comprises a rising edge 12 and a subsequent falling edge 13, i.e., two successive alternating frequency steps (jumps).

The appearance of a wheel 4 can thus be recognized or detected by detecting a rectangular pulse 11 that appears inside the time period $T_p$ of passage of the vehicle by 5, i.e., during the body pulse R. The wheel pulses 11 are superimposed on the body pulses R, and they indicate a wheel, only if they appear during the period $T_p$ of the vehicle pulses R. The detection of two successive edges or steps 12, 13, between which there is a substantially constant frequency can be a particularly simple criterion for a wheel rectangular pulse 11.

The reception frequency progression E5 shows the special case where the measurement beam 7 strikes the wheels 4 precisely at the level of their axles, where no tangential velocity of the wheel that could be projected in the direction of the measurement beam 7 exists, so that the wheels 4 are not detectable. This situation should be avoided.

The reception frequency progression E6 scans the wheels 4 at a level between their underside and their axle, and resembles that of E4, but with changes 11-13 of opposite sign. This situation is avoided, by an appropriate selection of the scanning height, because it is no longer always assured in this case that the body 5 is scanned, i.e., that the body pulse R also appears.

Figure 4:
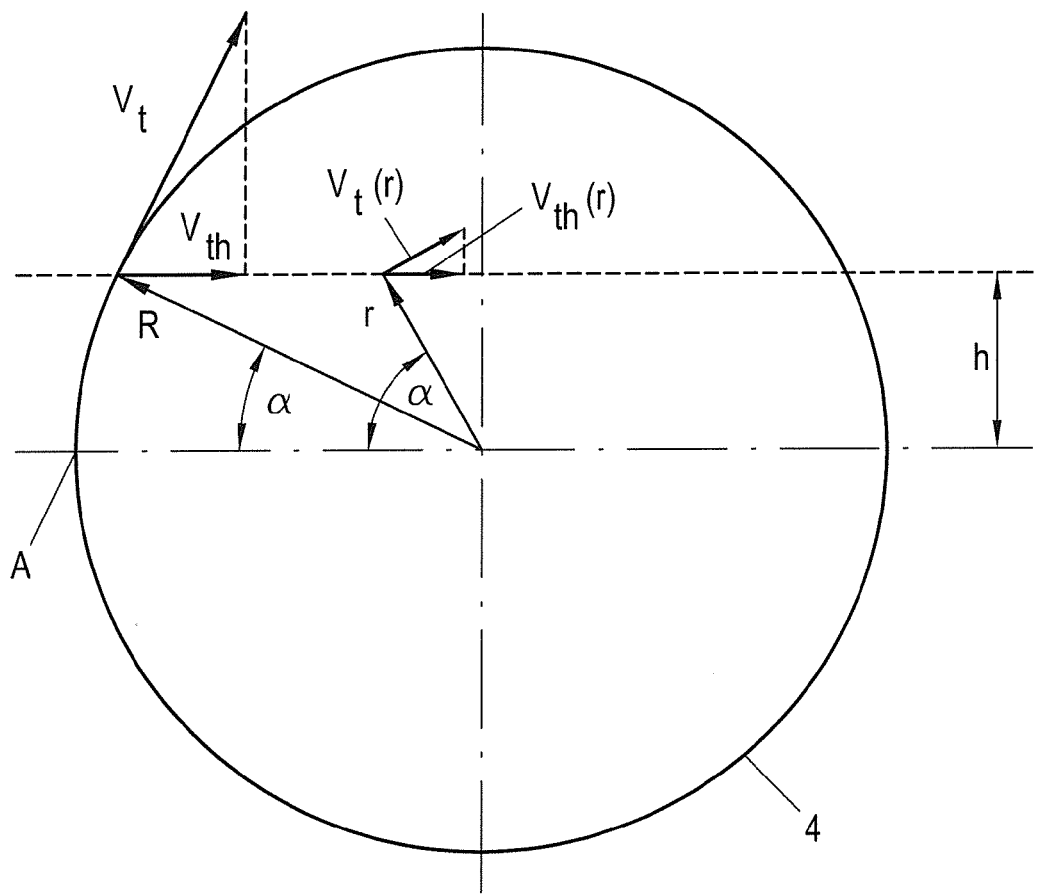
FIG. 4 shows the speed progressions on a rotating wheel, according to some embodiments of the present invention.

FIG. 4 analytically shows the extent of the offset 11 of a wheel 4 as a function of the height h of the respective scanning progression H1-H6 relative to the wheel axle A, using the scanning progression H4 as an example. If R is the radius of the wheel 4 and r an arbitrary radius inside of wheel 4, then the tangential velocity $v_t(r)$ at a radius r is proportional to this radius r:

$$v_t(r) = \frac{r}{R} v_t \quad (1)$$

The horizontal component $v_{th}(r)$ of the tangential velocity $v_t(r)$ in the travel direction 3 at an angle α is a sine projection corresponding to $$v_{th}(r) = \frac{r}{R} v_t \sin\alpha \quad (2)$$

with $$\sin\alpha = \frac{h}{r} \quad (3)$$

The horizontal component $v_{th}(r)$ of the tangential velocity thus results as $$v_{th}(r) = v_t \frac{h}{R} \quad (4)$$

The horizontal component $v_{th}(r)$ of the tangential velocity is thus directly proportional to the respectively considered height h of the scanning progression and is constant over this height h while the wheel 4 is being scanned.

The width of the pulse 11 corresponds to the section width of the wheel 4 at height h of the respective scanning progression, and the height of the pulse 11 is directly proportional to the height h.

It has been assumed that the transmission frequency of the radar/lidar device 6 or the measurement beam 7 is constant; i.e., its progression over time (temporal progression) is a constant progression. However, it is also possible that the device 6 emits a measurement beam 7 with a temporally non-constant transmission frequency, e.g., as in frequency hopping methods, in which the frequency constantly changes according to a predetermined or known pattern. The recorded reception frequency progressions E1-E6 are recorded relative to the previously known temporal progression of the transmission frequency for the measurement beam 7—whether constant or varying, i.e., referenced or standardized thereto, so that the effect of known transmission frequency progressions can be compensated.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for detecting a wheel of a vehicle that is traveling on a roadway in a travel direction, the vehicle having a vehicle body and wheels, which project downward from the vehicle body and are at least partially exposed laterally at the level of the vehicle body, the method comprising:

emitting a concentrated electromagnetic measurement beam with a known temporal progression of frequency from a side of the roadway onto an area at a predetermined distance above the roadway and at a slant with respect to the travel direction, the beam being concentrated in such a manner that its area of incidence on the vehicle has a maximum diameter in a centimeter range, receiving the measurement beam reflected by the passing vehicle and recording a temporal progression of frequency of the measurement beam relative to the known progression; and detecting a rectangular pulse occurring in the recorded progression within a time period when the vehicle body passes, as a wheel.

2. The method of claim 1, wherein the beam is concentrated in such a manner that its area of incidence on the vehicle has a maximum diameter of less than 5 cm.

3. The method of claim 1, wherein the beam is concentrated in such a manner that its area of incidence on the vehicle has a maximum diameter of less than 2 cm.

4. The method of claim 1, wherein the measurement beam is a radar beam in a frequency range above 70 GHz that is concentrated by a directional antenna.

5. The method of claim 1, wherein the measurement beam is a laser beam.

6. The method of claim 1, wherein the rectangular pulse is detected by detecting two successive alternating frequency steps, between which there is a substantially constant frequency.

7. An apparatus for detecting a wheel of a vehicle that is traveling on a roadway in a travel direction, the vehicle having a vehicle body and wheels, which project downward from the vehicle body and are at least partially exposed laterally at the level of the vehicle body, comprising:

a Doppler lidar or radar device that is configured to emit a concentrated electromagnetic measurement beam with a known temporal progression of frequency onto a target and to record a temporal progression, relative to the known progression, of the frequency of the reflected measurement beam, wherein the measurement beam is oriented from a side of the roadway onto an area at a predetermined distance above the roadway, slanted with respect to the direction of travel, and concentrated in such a manner that an area of incidence of the measurement beam on the vehicle has a maximum diameter in a centimeter range, and a downstream evaluation unit configured to detect a rectangular pulse occurring in the recorded progression within a time period when the vehicle body passes, as a wheel.

8. The apparatus of claim 7, wherein the beam is concentrated in such a manner that its area of incidence on the vehicle has a maximum diameter of less than 5 cm.

9. The apparatus of claim 7, wherein the beam is concentrated in such a manner that its area of incidence on the vehicle has a maximum diameter of less than 2 cm.

10. The apparatus of claim 7 comprising a Doppler radar device, wherein the measurement beam is a radar beam in a frequency range above 70 GHz, and includes a directional antenna for concentrating the radar beam.

11. The apparatus of claim 7 comprising a Doppler lidar device, wherein the measurement beam is a laser beam.

12. The apparatus of claim 7, wherein the evaluation unit is configured to detect the rectangular pulse based on two successive alternating frequency steps, between which there is a substantially constant frequency.

* * * * *

UNITED STATES PATENT AND TRADEMARK OFFICE
CERTIFICATE OF CORRECTION

PATENT NO. : 8,937,571 B2  
APPLICATION NO. : 13/489088  
DATED : January 20, 2015  
INVENTOR(S) : Oliver Nagy Page 1 of 1

It is certified that error appears in the above-identified patent and that said Letters Patent is hereby corrected as shown below:

On the title page, item (57), in column 2, in "Abstract", line 7, delete "area" and insert -- area at --, therefor.

Signed and Sealed this
Twenty-eighth Day of July, 2015

Michelle K. Lee
*Director of the United States Patent and Trademark Office*